May 19, 1964  S. H. AULD, JR  3,134,060
SERVO MOTOR CONTROL SYSTEM
Filed Dec. 1, 1960

INVENTOR.
SAMUEL H. AULD Jr.
BY
Mueller & Aichele
Attys.

United States Patent Office

3,134,060
Patented May 19, 1964

3,134,060
SERVO MOTOR CONTROL SYSTEM
Samuel H. Auld, Jr., Woodland Hills, Calif., assignor, by mesne assignments, to The Bendix Corporation, Baltimore, Md., a corporation of Delaware
Filed Dec. 1, 1960, Ser. No. 72,913
5 Claims. (Cl. 318—28)

This invention relates generally to servo control systems and more particularly to a follow-up arrangement for a control system having a servo motor for mechanically positioning an element in response to a control signal.

Control systems are used in many applications for mechanically positioning a member by action of a servo motor which operates in accordance with a control signal. One such application is in automatic pilots for aircraft wherein various elements such as the rudder, elevators and ailerons are moved to control the movement of the craft. In such systems it is necessary to provide a follow-up which responds to the movement which has taken place, and which will return the controlled element to a normal or center position after the desired movement is accomplished. Such follow-up systems have normally required an item such as a potentiometer or a synchro device directly attached to the element being moved which is objectionable in many cases. Follow-up systems which have been used have the disadvantage that they tend to overshoot so that a hunting action is produced which is undesirable.

It is therefore an object of the present invention to provide an improved follow-up system for use in a servo motor control system.

Another object of the invention is to provide a simple follow-up system which operates from the servo motor and which has both a direct and an integrated effect.

A feature of the invention is the provision of a follow-up arrangement for a servo motor control system wherein a direct current generator is coupled to the servo motor to provide a voltage in response to movement thereof, and which includes an integration circuit to alter the follow-up control voltage.

Another feature of the invention is the provision of a control system including a servo motor for positioning a movable element in response to a control signal, and including a velocity generator coupled to the servo motor and an integrating circuit coupled between the generator and a modulator which combines the control signal and the velocity generator voltage to produce an error signal which controls the servo motor. The integrating circuit includes a resistor which in effect excludes a part of the generator output from the integrating effect, and the circuit initially applies the full generator voltage balanced against the control signal, with the integrating circuit continuing to apply a voltage to cause the servo motor to return the element to its neutral or center position.

In practicing the invention there is provided a mechanical control system including a servo motor for moving an element in accordance with a control signal. The control signal may be produced from any source and may include a component which changes as the element is moved. A velocity generator is coupled to the servo motor and produces an output voltage which represents the rate of movement of the servo motor. This voltage is applied to an integrating circuit which includes a series resistor, and a resistor and capacitor in series forming the shunt branch. The resistor in the shunt branch effectively excludes a part of the voltage from the velocity generator from the integrating effect. The control signal and the voltage from the integrating circuit are applied to a modulator which produces an output or error signal representing the difference betwen the control signal and the voltage. It is to be understood that throughout the specification and in the claims the term "error signal" means that difference, of either polarity, which exists between the control signal and the signal representative of the condition of the element being controlled. The error signal is amplified and utilized to control the servo motor. As the error signal causes operation of the servo motor, the velocity generator produces a voltage which is integrated and balanced against the control signal and which eventually eliminates the error signal so that the servo motor stops. The voltage developed across the capacitor by the integrating action will continue after the servo motor stops and will produce an error signal of opposite phase to reverse the servo motor and return the element to a normal or center position.

The system may be used in an autopilot system for an aircraft in which case the control signal may be provided in part by a gyro which produces a signal which depends on the position of the aircraft. Accordingly, the control signal will be reduced as the aircraft moves to the desired position, and this cooperates with the follow-up signal from the velocity generator to control the movement of the aircraft. Such a system is illustrated and claimed in my copending application Serial No. 73,107, filed December 1, 1960.

Figure 1:
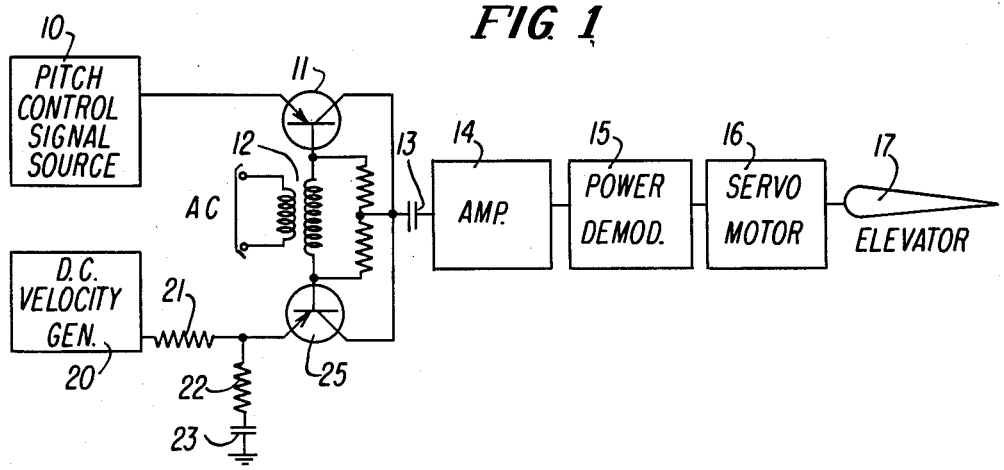
FIG. 1 is a schematic diagram of the system of the invention.

In FIG. 1 there is illustrated a system for controlling the elevators of an aircraft to thereby control the pitch of the aircraft. Signals are obtained from a pitch control signal source 10 which may include a plurality of components including one component derived from a gyro in the aircraft, and which varies with the position of the aircraft. This signal is applied to a modulator formed by transistor 11, being coupled to the emitter electrode thereof. The transistor 11 is rendered conducting on alternate half cycles of an alternating current signal which is applied through transformer 12, being coupled to the base and the collector electrodes of the transistor. During the half cycles when the transistor conducts a square wave output voltage is formed at the collector electrode and this is applied to the capacitor 13. This voltage applied through capacitor 13 is amplified in amplifier 14 and applied to a power demodulator 15 which controls servo motor 16. The servo motor 16 in turn controls the position of elevator 17 of the aircraft.

A direct current velocity generator 20 is connected to the servo motor 16 and is driven thereby. This may be a small direct current generator which produces a voltage which corresponds to the rate of movement of the servo motor. The output of the velocity generator is applied to an integrator circuit including resistors 21 and 22 and capacitor 23. The voltage across resistor 22 and capacitor 23 is applied to the emitter electrode of transistor 25. The transformer 12 is coupled to the base electrode of transistor 25 and applies the modulating wave thereto in opposite phase to that applied to transistor 11. The transistor 25 conducts on alternate half cycles and applies the voltage from the emitter electrode thereof to the collector electrode and to capacitor 13. Because the transistors 11 and 25 conduct on alternate half cycles, the square wave outputs thereof are 180° out of phase and the portions of the square wave of one polarity are in effect interspersed with each other.

The voltage from transistor 25 cooperates with the voltage from transistor 11 to provide an error signal which is applied through capacitor 13 to amplifier 14 and power demodulator 15 to the servo motor 16. The error signal is a square wave having an amplitude which corresponds to the difference between the amplitude of the square waves at the collector electrodes of transistors 11 and 25.

Either square wave may have the larger amplitude so that the output may in effect be reversed in polarity.

As stated above, the integrator circuit includes a resistor in addition to the capacitor in the shunt branch. This resistor takes a part of the voltage from the voltage generator 20 and in effect bypasses the integration effect. When the voltage generator initially produces a voltage, a part of this is developed across resistor 22 and applied to the transistor 25. The voltage produced by the generator will cause current flow through the circuit including resistors 21 and 22 to charge capacitor 23 so that the voltage thereacross builds up in accordance with the total movement or displacement of the servo motor. That is, the capacitor 23 stores a voltage representing the total movement. Accordingly the voltage across resistor 22 is first applied to the modulator formed by transistor 25, and then the voltage across capacitor 23 will be added to this and will remain when the voltage across resistor 22 from the generator 20 has ceased. Considering this in connection with the movement of the elevator of an aircraft as illustrated in FIG. 1, the voltage across resistor 22 varies with the velocity or rate of movement of the elevator at any given instant in time and the voltage across capacitor 23 will represent the total extent of the movement of the elevator. These two voltage components provide a desirable effect in the system as will be further described.

Figure 2:
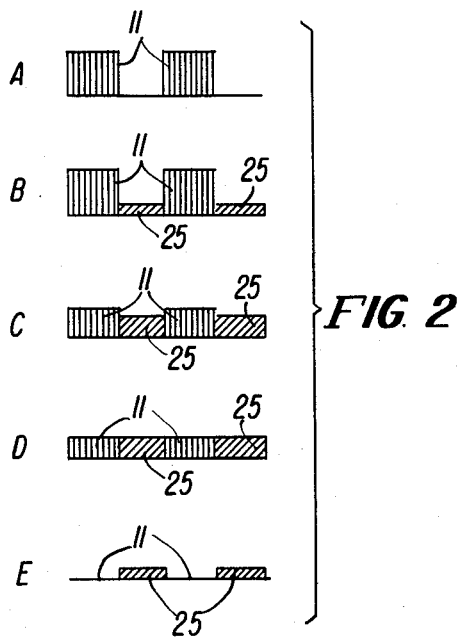
FIG. 2 is a chart illustrating the operation of the system.

The operation of the system will be apparent from a consideration of the curves of FIG. 2. When the pitch control signal source produces a signal calling for a change in the position of the elevator of the aircraft, the output of transistor 11 will be as shown by pulses 11 of curve A, and the output of transistor 25 will be zero until the servo motor starts to move. This produces an error signal which is amplified and causes the servo motor to operate. When the servo motor starts to move the voltage of the source will remain as in curve A but the velocity generator will provide a signal to the integrator circuit to produce a voltage which produces an output from transistor 25 as shown at 25 in curve B. This reduces the error signal as it is produced by the difference between the outputs of transistor 11 and transistor 25.

As the servo motor operates the elevators and the craft changes pitch, the control signal from the pitch control signal source will change because the gyro in the craft will change the portion of this signal derived therefrom. This further reduces the error signal as is illustrated in curve C of FIG. 2. The error signal will continue to reduce as the servo continues to operate to move the elevators until the signals from transistor 11 and transistor 25 are the same as shown in curve D, in which case the error signal is zero. This causes the servo motor to stop. The integrated voltage across capacitor 23 will still be present after the servo motor stops and will provide a voltage to transistor 25 as shown in curve E. This in effect reverses the phase of the error voltage and will cause the servo to move in the reverse direction to return the elevators to their normal or center position.

It is therefore seen that a follow-up arrangement is provided for use in a servo system which may be connected to the servo motor and requires no connection to the element moved. The system is quite simple requiring only a small direct current generator and an integrator circuit. The integrator circuit provides an output having a component which varies with the velocity or rate of movement of the element and a further component which varies with the extent or total movement of the element. The follow-up voltage can be combined with the control signal in a modulator to produce an error signal which in turn controls the servo motor. The circuit causes smooth control of the element being positioned and does not overshoot or provide hunting about a center position.

I claim:

1. In a servo system including means providing a control signal representing the desired movement of an element, and a servo motor for moving the element, a generator coupled to the servo motor for providing a direct current voltage representing the movement thereof, an integration circuit coupled to said generator including a series resistor and a shunt branch including a resistor and a capacitor, modulator means including first and second portions for producing square waves which are out of phase with respect to each other, means applying the control signal to said first portion of said modulator means to control the amplitude of said square wave produced thereby, means applying the voltage across said shunt branch of said integration circuit to said second portion of said modulator means to control the amplitude of said square wave produced thereby, said modulator means including means combining said square waves to produce an error signal when said square waves are of different amplitudes, and means responsive to said error signal for controlling the servo motor.

2. In an automatic pilot for an aircraft including means providing a control signal representing the desired movement of an element of the aircraft, and a servo motor for moving the element; a follow-up system for controlling the servo motor including in combination, a generator coupled to the servo motor for providing a direct current voltage representing the movement thereof, an integration circuit coupled to said generator including means for effectively excluding a portion of said voltage from said generator from the integration effect, modulator means including first and second portions for producing square waves which are out of phase with respect to each other, means applying the control signal to said first portion of said modulator means to control the amplitude of said square wave produced thereby, means applying the voltage from said integration circuit to said second portion of said modulator means to control the amplitude of said square wave produced thereby, said modulator means including means combining said square waves to produce an error signal when said square waves are of different amplitudes, and means responsive to said error signal for controlling the servo motor and thereby moving the element of the aircraft in the desired manner.

3. In an automatic pilot for an aircraft including means providing a control signal representing the desired movement of an element of an aircraft, and a servo motor for moving the element; a follow-up system for controlling the servo motor including in combination, a generator coupled to the servo motor for providing a direct current voltage representing the movement thereof, an integration circuit coupled to said generator including first and second resistors and a capacitor connected in series, modulator means including first and second portions for producing square waves which are out of phase with respect to each other, means applying the control signal to said first portion of said modulator means to control the amplitude of said square wave produced thereby, means applying the voltage across said capacitor and one of said resistors of said integration circuit to said second portion of said modulator means to control the amplitude of said square wave produced thereby, said modulator means including means combining said square waves to produce an error signal when said square waves are of different amplitudes, and means responsive to said error signal for controlling the servo motor and thereby moving the element of the aircraft in the desired manner.

4. In a servo system including means providing a first control signal representing a desired movement of an element and a servo motor for moving the element, a generator coupled to the servo motor for producing a direct current voltage representing the movement thereof, integrator means coupled to said generator for at least partially integrating the voltage therefrom to produce a second control signal, modulator means having first and second portions for producing square waves which are out of phase with respect to each other, means applying the first control signal to said first portion of said modulator means and said second control signal to said second portion of said modulator means to control the amplitude of said square waves, said modulator means including means combining said square waves to produce an error signal when said square waves are of different amplitude, and means responsive to said error signal for controlling the servo motor, whereby the instantaneous voltage developed across said integrator means is combined with the first control signal to cause the servo motor to move the element to a desired position and the integrated voltage developed across said integrator means subsequently causes the servo motor to move the element to a neutral position.

5. In a servo system including a servo motor for moving an element in response to a control signal, a follow-up circuit responsive to movement of the element including, means coupled to the servo motor for generating a direct current voltage representing the movement thereof, an integrating network coupled to said direct current voltage generating means and including means for effectively excluding a portion of said direct current voltage from the integrating effect of said integrating network, modulator means having first and second portions for producing square waves which are out of phase with respect to each other, means applying the control signal to said first portion of said modulator means to control the amplitude of said square wave produced thereby, and means for applying the voltage developed across said integrating network to said second portion of said modulator means to control the amplitude of said square wave produced thereby, said modulation means including means combining said square waves to produce an error signal when said square waves are of a different amplitude, with the instantaneous voltage developed across said integrating network being combined with the control signal to produce an error signal to cause the servo motor to move the element to a desired position and with the integrated voltage developed across said integrating network subsequently causing the servo motor to move the element to a neutral position.

References Cited in the file of this patent

UNITED STATES PATENTS

| | | |
|---|---|---|
| 2,448,564 | Wilkerson | Sept. 7, 1948 |
| 2,471,422 | Frost | May 31, 1949 |
| 2,513,537 | Williams | July 4, 1950 |
| 2,525,038 | Kutzler | Oct. 10, 1950 |
| 2,626,767 | Bromley | Jan. 27, 1953 |
| 2,944,201 | Doolen | July 5, 1960 |
| 3,027,505 | Auld | Mar. 27, 1962 |

OTHER REFERENCES

Terman, F. E.: Electronic and Radio Engineering, page 621, FIG. 18–ba, McGraw-Hill, New York, 1955.

Ahrendt and Taplen: Automatic Feedback Control, page 401, McGraw-Hill, New York, 1951.